US012638793B2

(12) United States Patent
Oba et al.

(10) Patent No.: US 12,638,793 B2
(45) Date of Patent: May 26, 2026

(54) IMAGE FORMING APPARATUS

(71) Applicant: KYOCERA Document Solutions Inc., Osaka (JP)

(72) Inventors: Keisuke Oba, Osaka (JP); Koji Uno, Osaka (JP); Kazuaki Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/044,817

(22) Filed: Feb. 4, 2025

(65) Prior Publication Data

US 2025/0258451 A1 Aug. 14, 2025

(30) Foreign Application Priority Data

Feb. 9, 2024 (JP) ................................ 2024-018723

(51) Int. Cl.
*G03G 15/16* (2006.01)

(52) U.S. Cl.
CPC ....... *G03G 15/162* (2013.01); *G03G 15/1615* (2013.01); *G03G 2215/00059* (2013.01)

(58) Field of Classification Search
CPC ........... G03G 15/5054; G03G 15/5058; G03G 15/161; G03G 15/1615; G03G 15/55; G03G 15/553; G03G 15/556; G03G 15/0131; G03G 15/0189
See application file for complete search history.

(56) References Cited

U.S. PATENT DOCUMENTS

| | | | | |
|---|---|---|---|---|
| 2007/0098423 A1* | 5/2007 | Hirayama | G03G 15/0131 | 399/49 |
| 2011/0150541 A1* | 6/2011 | Michibata | G03G 15/161 | 399/313 |
| 2011/0150542 A1* | 6/2011 | Kim | G03G 15/0131 | 399/313 |
| 2013/0322910 A1* | 12/2013 | Shiga | G03G 21/168 | 399/74 |
| 2016/0187829 A1* | 6/2016 | Ishizaki | G03G 15/556 | 399/49 |
| 2017/0075274 A1* | 3/2017 | Otsuka | G03G 15/5058 | |
| 2017/0269499 A1* | 9/2017 | Ishihara | G03G 9/0926 | |

(Continued)

FOREIGN PATENT DOCUMENTS

JP 2009-014956 A 1/2009

*Primary Examiner* — Carla J Therrien
(74) *Attorney, Agent, or Firm* — Stein IP, LLC

(57) ABSTRACT

An image forming apparatus includes an endless intermediate transfer belt, a plurality of rollers, a density sensor, and a positioning portion. The positioning portion is disposed opposite the density sensor, at the inner circumferential side of the intermediate transfer belt, and contacts the inner circumferential surface of the intermediate transfer belt to keep a predetermined distance across the gap between the intermediate transfer belt and the density sensor. The positioning portion includes a support member disposed at the inner circumferential side of the intermediate transfer belt to face the intermediate transfer belt, and an electrically conductive non-woven fabric laid on the surface of the support member facing the intermediate transfer belt to contact the inner circumferential surface of the intermediate transfer belt.

3 Claims, 4 Drawing Sheets

(56) References Cited

U.S. PATENT DOCUMENTS

| | | | | |
|---|---|---|---|---|
| 2018/0095376 | A1* | 4/2018 | Tabata ................. | G03G 15/162 |
| 2022/0113655 | A1* | 4/2022 | Aoyama ............ | G03G 15/1605 |
| 2025/0102974 | A1* | 3/2025 | Omori ................ | G03G 15/2057 |

* cited by examiner

IMAGE FORMING APPARATUS

INCORPORATION BY REFERENCE

This application is based on and claims the benefit of priority from Japanese Patent Application No. 2024-018723 filed on Feb. 9, 2024, the contents of which are hereby incorporated by reference.

BACKGROUND

The present disclosure relates to an image forming apparatus.

In image forming apparatuses employing an electrophotographic system, such as copiers and printers, it is common to supply toner to an electrostatic latent image formed on the outer circumferential surface of a photosensitive drum to develop it into a toner image that will subsequently be transferred to a sheet (recording medium). The density of the toner image formed by the image forming apparatus changes with time for various causes. Thus, calibration is commonly performed, in which a toner image for density correction (a reference image) is formed on the outer circumferential surface of the photosensitive drum or of an intermediate transfer belt and the toner density of the toner image is sensed with a sensor to perform density correction. Keeping the distance between the sensor and the toner image constant is important in proper density correction.

SUMMARY

According to one aspect of the present disclosure, an image forming apparatus includes an endless intermediate transfer belt, a plurality of rollers, a density sensor, and a positioning portion. Around the plurality of rollers, the intermediate transfer belt is rotatably stretched. The density sensor outputs a sensed value of the toner density of a toner image transferred to the outer circumferential surface of the intermediate transfer belt. The positioning portion is disposed opposite the density sensor, at the inner circumferential side of the intermediate transfer belt, and contacts the inner circumferential surface of the intermediate transfer belt to keep a predetermined distance across the gap between the intermediate transfer belt and the density sensor. The positioning portion includes a support member that is disposed at the inner circumferential side of the intermediate transfer belt so as to face the intermediate transfer belt, and an electrically conductive non-woven fabric that is laid on the surface of the support member facing the intermediate transfer belt so as to contact the inner circumferential surface of the intermediate transfer belt.

DETAILED DESCRIPTION

Now, an embodiment of the present disclosure will be described with reference to the drawings. Note that the description below is not meant to limit the scope of the present disclosure.

Figure 1:
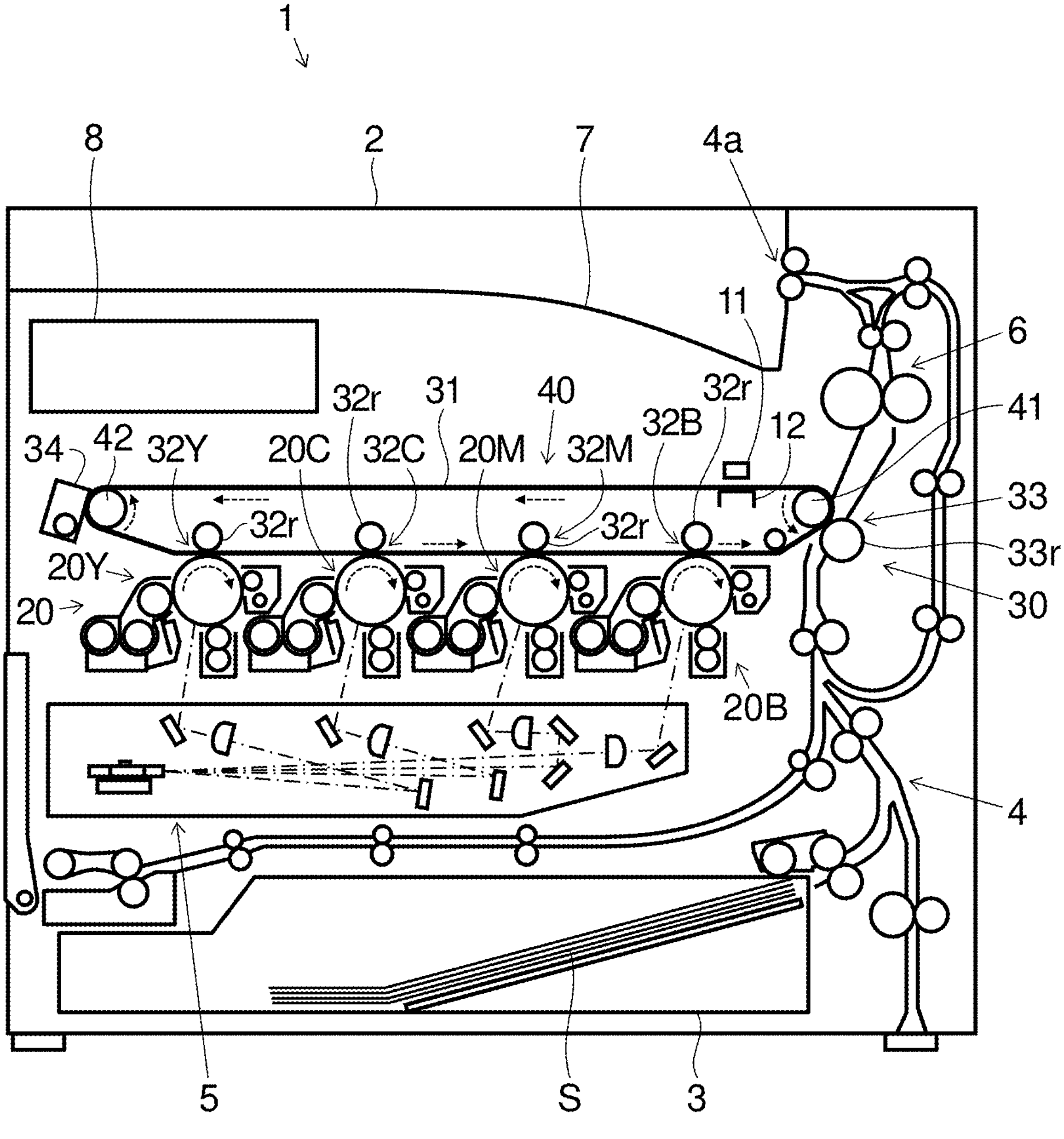
FIG. 1 is a schematic sectional front view of an image forming apparatus according to one embodiment of the present disclosure.
Figure 2:
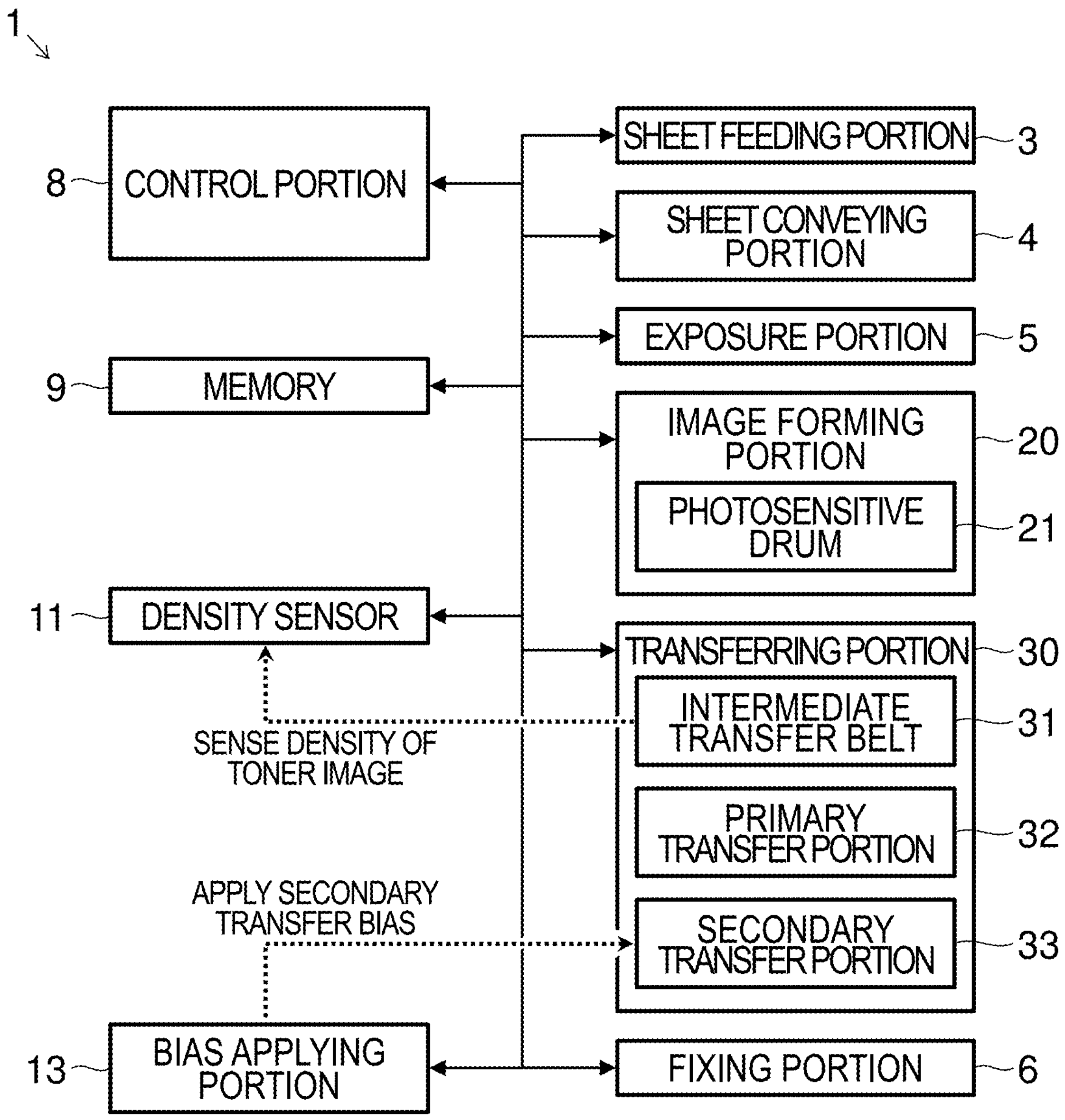
FIG. 2 is a block diagram showing the configuration of the image forming apparatus in FIG. 1.
Figure 3:
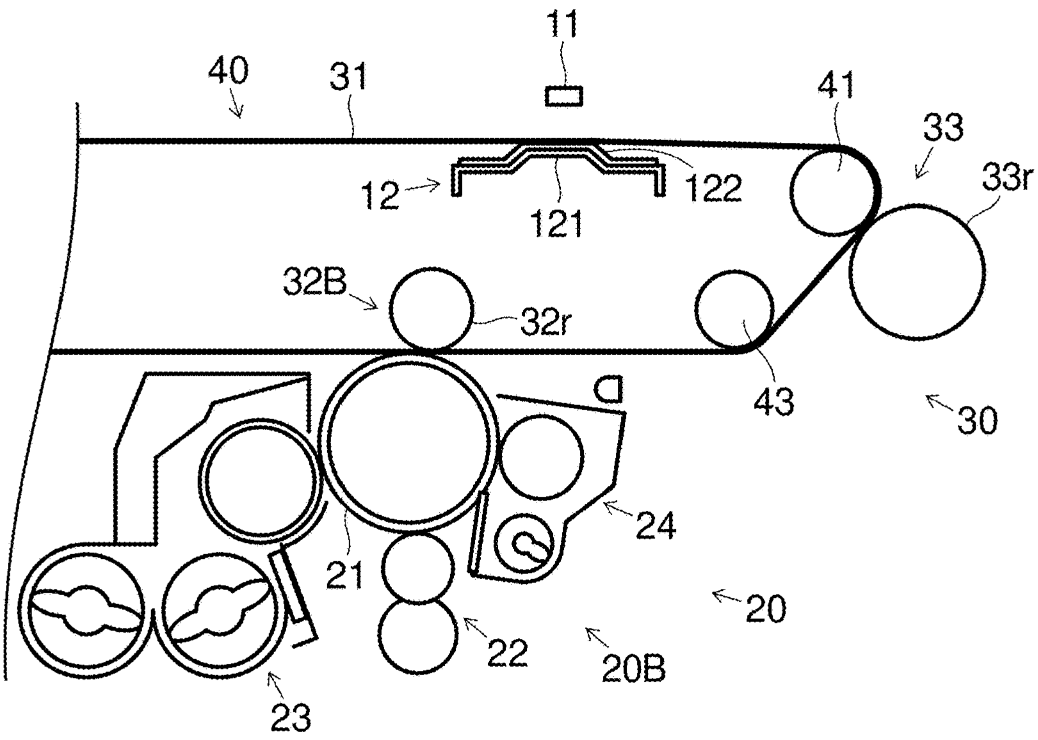
FIG. 3 is a schematic sectional front view around a secondary transfer portion in the image forming apparatus in FIG. 1.

FIG. 1 is a schematic sectional front view of an image forming apparatus 1 according to the embodiment. FIG. 2 is a block diagram showing the configuration of the image forming apparatus 1 in FIG. 1. FIG. 3 is a schematic sectional front view around a secondary transfer portion 33 in the image forming apparatus 1 in FIG. 1. One example of the image forming apparatus 1 according to the embodiment is a tandem color printer that transfers a toner image to a sheet S using an intermediate transfer belt 31. The image forming apparatus 1 can be what is called a multifunction peripheral having functions of, for example, printing, scanning (image reading), facsimile transmission, and the like.

As shown in FIGS. 1, 2, and 3, the image forming apparatus 1 includes, inside its body 2, a sheet feeding portion 3, a sheet conveying portion 4, an exposure portion 5, an image forming portion 20, a transferring portion 30, a fixing portion 6, a sheet ejection portion 7, a control portion 8, and a memory 9.

The sheet feeding portion 3 is disposed in a bottom part of the body 2. The sheet feeding portion 3 stores a plurality of unprinted sheets S and separates and feeds out one sheet S after another for printing. The sheet conveying portion 4 extends in the top-bottom direction along a side wall of the body 2. The sheet conveying portion 4 conveys the sheet S fed from the sheet feeding portion 3 to the secondary transfer portion 33 and the fixing portion 6, and ejects the sheet S after fixing through the sheet ejection port 4*a* to the sheet ejection portion 7. The exposure portion 5 is disposed above the sheet feeding portion 3. The exposure portion 5 exposes the image forming portion 20 to laser light controlled based on image data.

The image forming portion 20 is disposed above the exposure portion 5, below the intermediate transfer belt 31. The image forming portion 20 includes an image forming portion 20Y for yellow, an image forming portion 20C for cyan, an image forming portion 20M for magenta, an image forming portion 20B for black. These four image forming portions 20 have basically the same configuration. Thus, in the following description, except when distinction is needed, suffixes distinguishing the colors, "Y," "C," "M," and "B" are sometimes omitted.

The image forming portion 20 includes a photosensitive drum 21 that is supported so as to be rotatable in a predetermined direction (clockwise in FIGS. 1 and 3). The image forming portion 20 further includes a charging portion 22, a development portion 23, and a drum cleaning portion 24 that are disposed around the photosensitive drum 21 along its rotational direction. Note that a primary transfer portion 32 is disposed between the development portion 23 and the drum cleaning portion 24.

The photosensitive drum 21 has a photosensitive layer formed on its outer circumferential surface. The charging portion 22 electrostatically charges the outer circumferential surface of the photosensitive drum 21 to a predetermined surface potential. The exposure portion 5 exposes the outer circumferential surface of the photosensitive drum 21 charged by the charging portion 22 to light to form, by attenuating the charge on the outer circumferential surface of the photosensitive drum 21, an electrostatic latent image based on a document image. The development portion 23 supplies toner to and thereby develops the electrostatic latent image on the outer circumferential surface of the photosensitive drum 21 to form a toner image. The four image forming portions 20 form toner images of mutually different colors. The drum cleaning portion 24 performs cleaning by removing the residual toner left on the outer circumferential surface of the photosensitive drum 21 after primary transfer of the toner images to the outer circumferential surface of the intermediate transfer belt 31. In this way, the image forming portion 20 forms the image (toner image) that will be subsequently transferred to the sheet S.

The transferring portion 30 includes the intermediate transfer belt 31, the primary transfer portions 32Y, 32C, 32M, and 32B, the secondary transfer portion 33, and a belt cleaning portion 34. The intermediate transfer belt 31 is disposed above the four image forming portions 20. The intermediate transfer belt 31 is supported so as to be rotatable in a predetermined direction (counterclockwise in FIGS. 1 and 3). The intermediate transfer belt 31 is an endless intermediate transfer member to which the toner images formed on the outer circumferential surfaces of the photosensitive drums 21 in the four image forming portions 20 are primarily transferred sequentially so as to be overlayed on each other. The four image forming portions 20 are disposed in what is called a tandem arrangement, in which they are arrayed in a row from upstream to downstream in the rotational direction of the intermediate transfer belt 31.

The primary transfer portions 32Y, 32C, 32M, and 32B are disposed, across the intermediate transfer belt 31, above the image forming portions 20Y, 20C, 20M, and 20B of the corresponding colors. The secondary transfer portion 33 is disposed upstream of the fixing portion 6 with respect to the sheet conveyance direction of the sheet conveying portion 4, downstream of the four image forming portions 20Y, 20C, 20M, and 20B with respect to the rotational direction of the intermediate transfer belt 31. The belt cleaning portion 34 is disposed downstream of the secondary transfer portion 33 with respect to the rotational direction of the intermediate transfer belt 31.

The primary transfer portion 32 transfers the toner image formed on the outer circumferential surface of the photosensitive drum 21 to the intermediate transfer belt 31. In other words, the toner image is primarily transferred to the outer circumferential surface of the intermediate transfer belt 31 at the primary transfer portions 32Y, 32C, 32M, and 32B of the corresponding colors. Then as the intermediate transfer belt 31 rotates, with predetermined timing, the toner images of the four image forming portions 20 are transferred to the intermediate transfer belt 31 sequentially so as to be overlayed on each other to form a color toner image having the toner images of four colors, namely yellow, cyan, magenta, and black, overlayed on each other on the outer circumferential surface of the intermediate transfer belt 31.

The color toner image on the outer circumferential surface of the intermediate transfer belt 31 is transferred to the sheet S synchronously fed by the sheet conveying portion 4 at a secondary transfer nip portion formed in the secondary transfer portion 33. The belt cleaning portion 34 performs cleaning by removing foreign matter such as residual toner left on the outer circumferential surface of the intermediate transfer belt 31 after secondary transfer. In this way, the transferring portion 30 transfers (records) the toner image formed on the outer circumferential surface of the photosensitive drum 21 to the sheet S.

The fixing portion 6 is disposed above the secondary transfer portion 33. The fixing portion 6 heats and presses the sheet S having the toner image transferred to it to fix the toner image to the sheet S.

The sheet ejection portion 7 is disposed above the transferring portion 30. The sheet S having the toner image fixed to it and having undergone printing is conveyed to the sheet ejection portion 7. In the sheet ejection portion 7, the printed sheet (printed matter) can be retrieved upward.

The control portion 8 includes a CPU, an image processing portion, and other electronic circuits and components (none of which is shown). The CPU controls the operation of different components in the image forming apparatus 1 based on programs and data for control stored in the memory 9 to perform processes related to the functions of the image forming apparatus 1. The sheet feeding portion 3, the sheet conveying portion 4, the exposure portion 5, the image forming portion 20, the transferring portion 30, and the fixing portion 6 individually receive instructions from the control portion 8 and operate together to perform printing on the sheet S.

The memory 9 is configured with a combination of a non-volatile memory device (not shown) such as a program ROM (read only memory) or a data ROM and a volatile memory device (not shown) such as a RAM (random access memory).

Now, the configuration around the transferring portion 30 will be described in detail. The transferring portion 30 includes an intermediate transferring device 40 as shown in FIGS. 1 and 3. The intermediate transferring device 40 includes the intermediate transfer belt 31, a drive roller (first support roller) 41, a tension roller 42, a support roller (second support roller) 43, and four primary transfer rollers 32*r*.

The intermediate transfer belt 31 is an endless belt which is rotatably stretched around a plurality of rollers. In the embodiment, the plurality of rollers include the drive roller 41 and the tension roller 42. Above the four image forming portions 20Y, 20C, 20M, and 20B, the primary transfer rollers 32*r* are respectively disposed across the intermediate transfer belt 31. The four primary transfer rollers 32*r* are each disposed at a position opposite the photosensitive drums 21 across the intermediate transfer belt 31 so as to contact the inner circumferential surface of the intermediate transfer belt 31.

For the intermediate transfer belt 31, a dielectric resin member, that is, a resin member containing electrically conductive carbon, is used. The intermediate transfer belt 31 is a seamless belt without a seam. The surface resistivity of the intermediate transfer belt 31 is 9.5 [log Ω/sq.] or more but 10.5 [log Ω/sq.] or less.

The drive roller 41 is disposed downstream of the four primary transfer portions 32Y, 32C, 32M, and 32B with respect to the rotational direction of the intermediate transfer belt 31. In other words, the drive roller 41 is disposed between the four primary transfer portions 32Y, 32C, 32M, and 32B and a density sensor 11, which will be described later, with respect to the rotational direction of the intermediate transfer belt 31. The drive roller 41 contacts the inner circumferential surface of the intermediate transfer belt 31 so as to have the intermediate transfer belt 31 rotatably stretched around it. The drive roller 41 receives power from a drive motor (not shown) to rotate the intermediate transfer belt 31 counterclockwise in FIGS. 1 and 3.

The drive roller 41 is disposed adjacent to the secondary transfer portion 33. In the secondary transfer portion 33, a secondary transfer roller 33*r* is disposed. The secondary transfer roller 33*r* is disposed, across the intermediate transfer belt 31, opposite the drive roller 41 so as to contact the outer circumferential surface of the intermediate transfer belt 31. The secondary transfer roller 33*r* secondarily transfers the toner image primarily transferred to the outer circumferential surface of the intermediate transfer belt 31 to the sheet S passing between the secondary transfer roller 33*r* and the intermediate transfer belt 31.

The tension roller 42 is disposed upstream of the four primary transfer portions 32Y, 32C, 32M, and 32B with respect to the rotational direction of the intermediate transfer belt 31. The tension roller 42 rotates counterclockwise in FIG. 1 by following the rotation of the intermediate transfer belt 31. The opposite ends of the tension roller 42 in the axial direction are urged by a pair of tension springs (not shown) in the direction away from the drive roller 41, that is, leftward in FIGS. 1 and 3. Thus, a predetermined tension is given to the intermediate transfer belt 31.

The support roller 43 is disposed between the four primary transfer portion 32Y, 32C, 32M, and 32B and the drive roller 41 with respect to the rotational direction of the intermediate transfer belt 31. The support roller 43 contacts the inner circumferential surface of the intermediate transfer belt 31 so as to have the intermediate transfer belt 31 rotatably stretched around it.

The four primary transfer rollers 32*r* are disposed, across the intermediate transfer belt 31, above the four image forming portions 20, respectively. The primary transfer rollers 32*r* are disposed, across the intermediate transfer belt 31, opposite the photosensitive drums 21, respectively, and contact the inner circumferential surface of the intermediate transfer belt 31 so that the intermediate transfer belt 31 is rotatably stretched around them. The primary transfer rollers 32*r* primarily transfer the toner images formed on the outer circumferential surfaces of the four photosensitive drums 21 sequentially while overlaying them on one after another to the outer circumferential surface of the intermediate transfer belt 31.

The image forming apparatus 1 further includes a density sensor 11 and a positioning portion 12.

The density sensor 11 is disposed downstream of the secondary transfer portion 33 with respect to the rotational direction of the intermediate transfer belt 31, above the intermediate transfer belt 31 apart from it. The density sensor 11 faces the outer circumferential surface of the intermediate transfer belt 31 in the top-bottom direction.

The density sensor 11 comprises a reflective optical sensor (not shown) having a light emitter including a light-emitting element such as an LED (light emitting diode) and a light receiver including a light-receiving element such as a photodiode. The light emitter shines sensing light at a predetermined angle to the toner image primarily transferred to the outer circumferential surface of the intermediate transfer belt 31. The light receiver receives the sensing light (reflected light) shone from the light emitter to the toner image and reflected from the toner image.

The density sensor 11 can output the level of the sensing light received by the light receiver as a sensed value (voltage value) of toner density, then derive the amount of toner in the toner image primarily transferred to the outer circumferential surface of the intermediate transfer belt 31, and thereby sense the toner density of the toner image. When no toner is on the outer circumferential surface of the intermediate transfer belt 31, the sensing light shone from the light emitter is not diffusely reflected by toner but regularly reflected, and more of it enters the light receiver. Thus, the sensed value (voltage value) of toner density is higher. The more toner there is on the outer circumferential surface of the intermediate transfer belt 31, the more light is diffusely reflected by toner, and thus the less light enters the light receiver. In other words, the sensed value (voltage value) of toner density is accordingly lower.

In this way, the density sensor 11 shines, from the light emitter, the sensing light to the toner image and outputs the sensed value of the toner density of the toner image primarily transferred to the outer circumferential surface of the intermediate transfer belt 31 based on the sensing light reflected from the toner image and received by the light receiver; thereby it senses the toner density.

The positioning portion 12 is disposed opposite the density sensor 11, at the inner circumferential side of the intermediate transfer belt 31. The positioning portion 12 contacts the inner circumferential surface of the intermediate transfer belt 31 to keep a predetermined distance across the gap between the intermediate transfer belt 31 and the density sensor 11. The positioning portion 12 includes a support member 121 and a non-woven fabric 122.

The support member 121 is disposed at the inner circumferential side of the intermediate transfer belt 31 so as to face it. The support member 121 is made of, for example, sheet metal with a section substantially in the shape of a U as seen from the axial direction of the drive roller 41 and extends along the axial direction. A part of the support member 121 facing the inner circumferential surface of the intermediate transfer belt 31 is formed substantially in the shape of a flat plate with a facing surface extending along the movement direction of the intermediate transfer belt 31 and along the axial direction of the drive roller 41.

The non-woven fabric 122 is laid on the surface of the support member 121 facing the intermediate transfer belt 31 so as to contact the inner circumferential surface of the intermediate transfer belt 31. Specifically, the non-woven fabric 122 lies in surface contact with the inner circumferential surface of the intermediate transfer belt 31 along the movement direction of the intermediate transfer belt 31 and along the axial direction of the drive roller 41. The non-woven fabric 122 has a thickness of, for example, 0.2 [mm] or more but 2 [mm] or less. The non-woven fabric 122 is electrically conductive.

Figure 4:
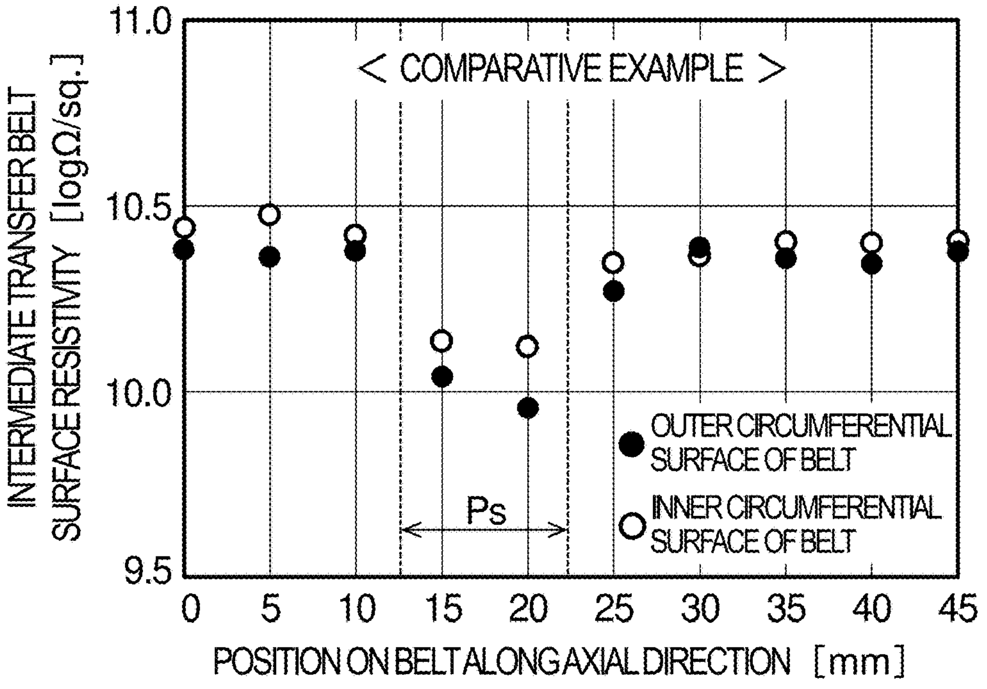
FIG. 4 is a graph showing the surface resistivity of an intermediate transfer belt in an image forming apparatus of a comparative example.
Figure 5:
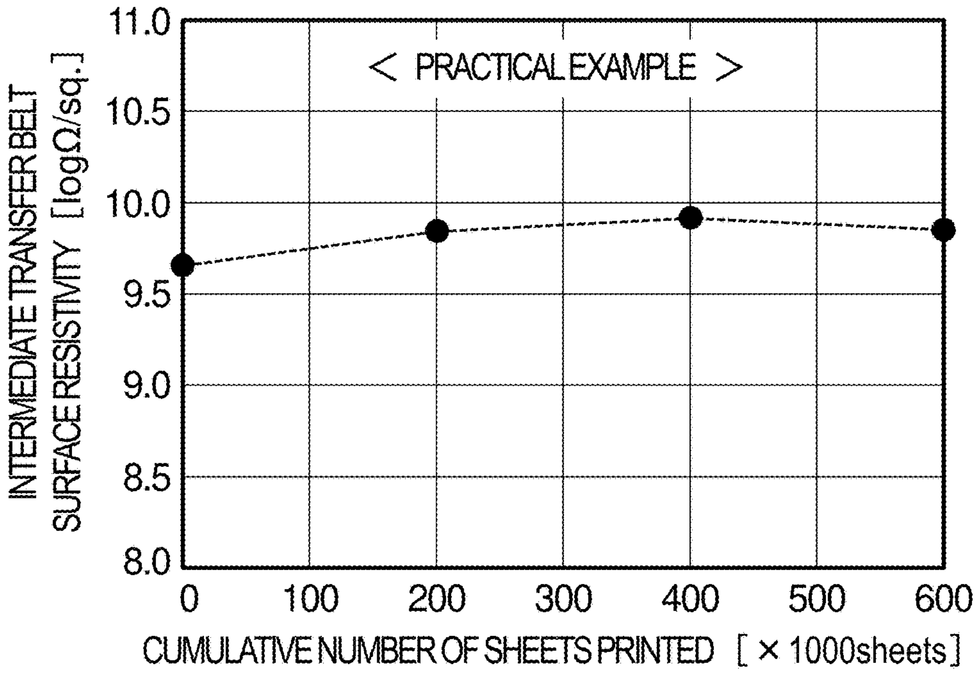
FIG. 5 is a graph showing the change of the surface resistivity of an intermediate transfer belt in the image forming apparatus of a practical example.

Now, a practical example will be described. FIG. 4 is a graph showing the surface resistivity of an intermediate transfer belt in an image forming apparatus of a comparative example. FIG. 5 is a graph showing the change of the surface resistivity of the intermediate transfer belt 31 in the image forming apparatus 1 of a practical example. For each of the image forming apparatuses of the practical and comparative examples, an evaluation was made of the effect of the configuration of the non-woven fabric 122 in the positioning portion 12 on the change of the surface resistivity of the intermediate transfer belt 31.

As mentioned above, in the practical example, the non-woven fabric 122 in the positioning portion 12 is electrically conductive. On the other hand, in the comparative example, the non-woven fabric 122 of the positioning portion 12 is electrically insulating.

In FIG. 4 showing the comparative example, the horizontal axis indicates the position on the intermediate transfer belt 31 along the axial direction and the vertical axis indicates the surface resistivity of the intermediate transfer belt 31. On the intermediate transfer belt 31 of the comparative example, a region Ps that includes the area spanning between 15 and 20 [mm] from one end (position 0 [mm]) of it in the axial direction is contacted by the electrically insulating non-woven fabric 122 in the positioning portion 12.

With the comparative example, FIG. 4 reveals that the surface resistivity in the region Ps on the intermediate transfer belt 31 is lower than around it. This suggests that contact with the electrically insulating non-woven fabric causes frictional electrification and hence dielectric breakdown in the region Ps of the intermediate transfer belt 31, resulting in a drop in the surface resistivity.

In FIG. 5 showing the practical example, the horizontal axis indicates the cumulative number of sheets printed on the image forming apparatus 1 and the vertical axis indicates the surface resistivity of the intermediate transfer belt 31.

With the practical example, FIG. 5 reveals that, even after printing on 600 thousand sheets, the surface resistivity of the intermediate transfer belt 31 exhibits hardly any drop. In this way, with the configuration of the embodiment, where the non-woven fabric 122 that contacts the inner circumferential surface of the intermediate transfer belt 31 is electrically conductive, it is possible to prevent change of the surface resistivity of the intermediate transfer belt 31 for a long term. It is thus possible to keep performing high-quality image formation on the image forming apparatus 1, and prolong its service life.

Preferably, the contact pressure that acts on the support member 121 via the non-woven fabric 122 against the intermediate transfer belt 31 is 1 [N/m$^2$] or more, the non-woven fabric 122 has a thickness of 0.2 [mm] or more in the direction in which it faces the intermediate transfer belt 31, and has a thickness variation of 0.1 [mm] or less when it contacts the intermediate transfer belt 31. With this configuration, the non-woven fabric 122 hardly changes its thickness under the tension of the intermediate transfer belt 31 and this helps keep constant the distance between the sensor in the density sensor 11 and the toner image on the intermediate transfer belt 31 for a long term. This makes it possible to keep performing proper density correction.

Preferably, the non-woven fabric 122 has a coefficient of dynamic friction of 0.2 or less on its contact surface with the intermediate transfer belt 31. This configuration allows smooth sliding of the intermediate transfer belt 31 contacting the non-woven fabric 122, preventing the non-woven fabric 122 from acting as a brake on the driving of the intermediate transfer belt 31. It is thus possible to keep driving the intermediate transfer belt 31 smoothly even under constant contact with the non-woven fabric 122 and to keep performing high-quality image formation.

The non-woven fabric 122 also has a cleaning function, which allows removal of toner, dust, and the like adhered on the inner circumferential surface of the intermediate transfer belt 31. This helps suppress wear of the inner circumferential surface of the intermediate transfer belt 31. It also helps prevent toner, dust, and the like adhered on the inner circumferential surface of the intermediate transfer belt 31 from adhering to the outer circumferential surface of the drive roller 41. This makes it possible to prevent their adverse effect on the rotation driving of the intermediate transfer belt 31 by the drive roller 41.

Figure 6:
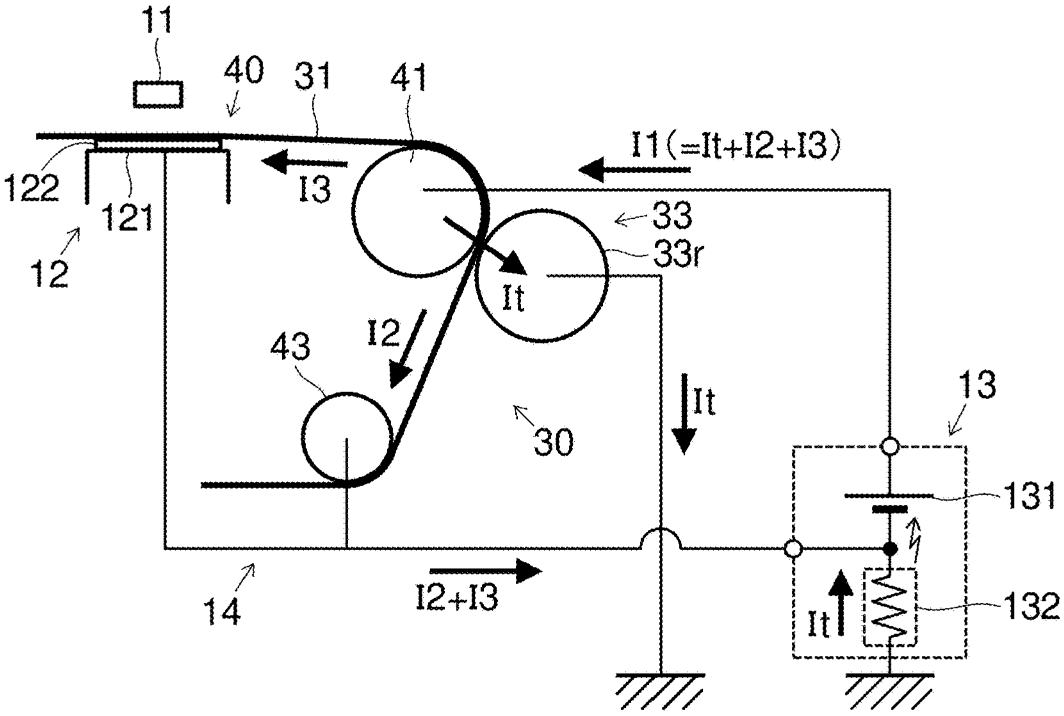
FIG. 6 is a diagram illustrating the configuration of a bias applying circuit around the secondary transfer portion in FIG. 3.

Now, the configuration of a bias applying circuit around the secondary transfer portion 33 will be described in detail. FIG. 6 is a diagram illustrating the configuration of the bias applying circuit around the secondary transfer portion 33 in FIG. 3. Note that, in the embodiment, the non-woven fabric 122 in the positioning portion 12 has a surface resistivity of, for example, 6 [log Ω/sq.] or less. As shown in FIG. 6, the image forming apparatus 1 includes a bias applying portion 13 and a feedback portion 14.

The bias applying portion 13 includes a power supplying portion 131 and is electrically connected to the drive roller 41. The bias applying portion 13 applies a secondary transfer bias to the drive roller (first support roller) 41. The control portion 8 controls the bias applying portion 13 so that a predetermined output current I1 is output to the drive roller 41.

Note that the output current I1 to the drive roller 41 includes a secondary transfer current It that flows into the secondary transfer roller 33*r* and that is necessary for secondary transfer, an influx current I2 that flows into the support member 121 via the intermediate transfer belt 31, and an influx current I3 that flows into the support roller (second support roller) 43 via the intermediate transfer belt 31.

The feedback portion 14 electrically connects the support member 121 and the support roller 43 to the bias applying portion 13. When the secondary transfer bias is applied to the drive roller 41, the feedback portion 14 returns, to the bias applying portion 13, the influx currents I2 and I3 that have flowed from the drive roller 41 via the intermediate transfer belt 31 into the support member 121 and the support roller 43. Moreover, the feedback portion 14 is grounded via an electrically resistive element 132.

With the configuration described above, it is possible to suppress the shortage, caused by the influx currents I2 and I3 flowing into the support member 121 and the support roller 43, of the secondary transfer current It necessary for the secondary transfer of the toner image to the sheet S. Thus, with the feedback portion 14, an adequate secondary transfer bias can be applied. This allows high-quality image formation.

While an embodiment of the present disclosure is described herein, it is not meant to limit the scope of the present disclosure, which can thus be implemented with various modifications made without departing from the spirit of the present disclosure.

What is claimed is:

1. An image forming apparatus comprising:

an intermediate transfer belt that is endless;

a plurality of rollers around which the intermediate transfer belt is rotatably stretched;

a density sensor that outputs a sensed value of a toner density of a toner image transferred to an outer circumferential surface of the intermediate transfer belt; and a positioning portion that is disposed opposite the density sensor, at an inner circumferential side of the intermediate transfer belt, the positioning portion contacting an inner circumferential surface of the intermediate transfer belt to keep a predetermined distance across a gap between the intermediate transfer belt and the density sensor, wherein the positioning portion includes:

a support member that is disposed at the inner circumferential side of the intermediate transfer belt so as to face the intermediate transfer belt; and a non-woven fabric that is laid on a surface of the support member facing the intermediate transfer belt so as to contact the inner circumferential surface of the intermediate transfer belt, the non-woven fabric being electrically conductive, and the image forming apparatus further comprises:

a primary transfer portion that is disposed upstream of the density sensor with respect to a rotational direction of the intermediate transfer belt, the primary transfer portion primarily transferring the toner image formed on an outer circumferential surface of a photosensitive drum to the outer circumferential surface of the intermediate transfer belt;

a first support roller that is disposed between the density sensor and the primary transfer portion so as to have the intermediate transfer belt rotatably stretched therearound;

a second support roller that is disposed between the primary transfer portion and the first support roller so as to have the intermediate transfer belt rotatably stretched therearound;

a secondary transfer roller that is disposed, across the intermediate transfer belt, opposite the first support roller, the secondary transfer roller secondarily transferring the toner image primarily transferred to the outer circumferential surface of the intermediate transfer belt to a sheet passing between the secondary transfer roller and the intermediate transfer belt;

a bias applying portion that applies a secondary transfer bias to the first support roller; and a feedback portion that electrically connects the support member and the second support roller to the bias applying portion such that, when the secondary transfer bias is applied to the first support roller, the feedback portion returns, to the bias applying portion, an influx current that has flowed from the first support roller via the intermediate transfer belt into the support member and the second support roller.

2. The image forming apparatus according to claim 1, wherein a contact pressure that acts on the support member via the non-woven fabric against the intermediate transfer belt is 1 [N/$m^2$] or more, and the non-woven fabric has a thickness of 0.2 [mm] or more in a direction in which the non-woven fabric faces the intermediate transfer belt, and has a thickness variation of 0.1 [mm] or less when the non-woven fabric contacts the intermediate transfer belt.

3. The image forming apparatus according to claim 1, wherein the feedback portion is grounded via an electrically resistive element.

* * * * *